United States Patent
Rados et al.

(10) Patent No.: US 8,955,113 B2
(45) Date of Patent: Feb. 10, 2015

(54) RESPONDING TO IMPERMISSIBLE BEHAVIOR OF USER DEVICES

(75) Inventors: Steven R. Rados, Danville, CA (US); Thomas W. Haynes, San Ramon, CA (US); Lalit Ratilal Kotecha, San Ramon, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 619 days.

(21) Appl. No.: 13/247,152

(22) Filed: Sep. 28, 2011

(65) Prior Publication Data

US 2013/0081138 A1 Mar. 28, 2013

(51) Int. Cl.
*G06F 11/00* (2006.01)
*G06F 21/57* (2013.01)
*H04L 12/24* (2006.01)
*G06F 21/55* (2013.01)

(52) U.S. Cl.
CPC ............ *G06F 21/57* (2013.01); *H04L 41/0813* (2013.01); *G06F 21/554* (2013.01); *G06F 21/577* (2013.01); *H04L 41/0681* (2013.01)
USPC .......................................................... 726/22

(58) Field of Classification Search
CPC . H04L 41/0681; H04L 41/0813; H04L 63/10; G06F 21/57; G06F 21/55
USPC .......................................................... 726/22
See application file for complete search history.

(56) References Cited

U.S. PATENT DOCUMENTS

| | | | | |
|---|---|---|---|---|
| 5,963,625 A * | 10/1999 | Kawecki et al. | ......... | 379/127.01 |
| 6,546,493 B1 * | 4/2003 | Magdych et al. | ................ | 726/25 |
| 6,993,790 B2 * | 1/2006 | Godwin et al. | ..................... | 726/4 |
| 7,225,468 B2 * | 5/2007 | Waisman et al. | ................ | 726/23 |
| 7,526,792 B2 * | 4/2009 | Ross | .................. | 726/2 |
| 7,665,119 B2 * | 2/2010 | Bezilla et al. | ...................... | 726/1 |
| 8,027,296 B2 * | 9/2011 | Hu et al. | ........................ | 370/329 |
| 8,185,740 B2 * | 5/2012 | Choe et al. | ..................... | 713/175 |
| 2002/0049062 A1* | 4/2002 | Petersen | ........................ | 455/453 |
| 2005/0015623 A1* | 1/2005 | Williams et al. | ................ | 713/201 |
| 2006/0047826 A1* | 3/2006 | Cromer et al. | ................ | 709/229 |
| 2006/0053475 A1* | 3/2006 | Bezilla et al. | ...................... | 726/1 |
| 2007/0044152 A1* | 2/2007 | Newman et al. | ................. | 726/24 |
| 2007/0124803 A1* | 5/2007 | Taraz | ................... | 726/4 |
| 2009/0313373 A1* | 12/2009 | Hanna et al. | ................... | 709/225 |
| 2011/0035592 A1* | 2/2011 | Cha et al. | ....................... | 713/169 |
| 2014/0089475 A1* | 3/2014 | Limont et al. | ................. | 709/221 |

* cited by examiner

Primary Examiner — Michael Chao

(57) ABSTRACT

A device detects an impermissible behavior by a user device. The device further identifies a rule associated with the impermissible behavior and executes a response to the impermissible behavior based on the rule. The response restricts access of the user device to a service provided by or via a network device. The device also transmits, to the user device, a message that specifies the response. The device also verifies a termination of a cause of the impermissible behavior and restores the access of the user device to the service.

20 Claims, 6 Drawing Sheets

RESPONDING TO IMPERMISSIBLE BEHAVIOR OF USER DEVICES

BACKGROUND

A mobile communication device can engage in impermissible behavior, such as making repeated invalid log-in attempts to applications provided by a telecommunication carrier of the mobile communication device, transmitting mal-formed packets, etc. The impermissible behavior may negatively impact the performance of the mobile communication device, such as by draining a battery of the mobile communication device and/or exhausting a radio link capacity of the mobile communication device. As a result, a user of the mobile communication device may be unable to use the mobile communication device for its intended purpose(s) (e.g., to place calls, to access web services via the Internet, etc.) during and/or after performance of the impermissible behavior. A client application can be installed on the mobile communication device to detect some impermissible behaviors. However, the client application would consume a lot of memory of the mobile communication device, and would be processor intensive. As a result, the client application would also negatively impact the performance of the mobile communication device.

DETAILED DESCRIPTION OF PREFERRED EMBODIMENTS

Figure 1:
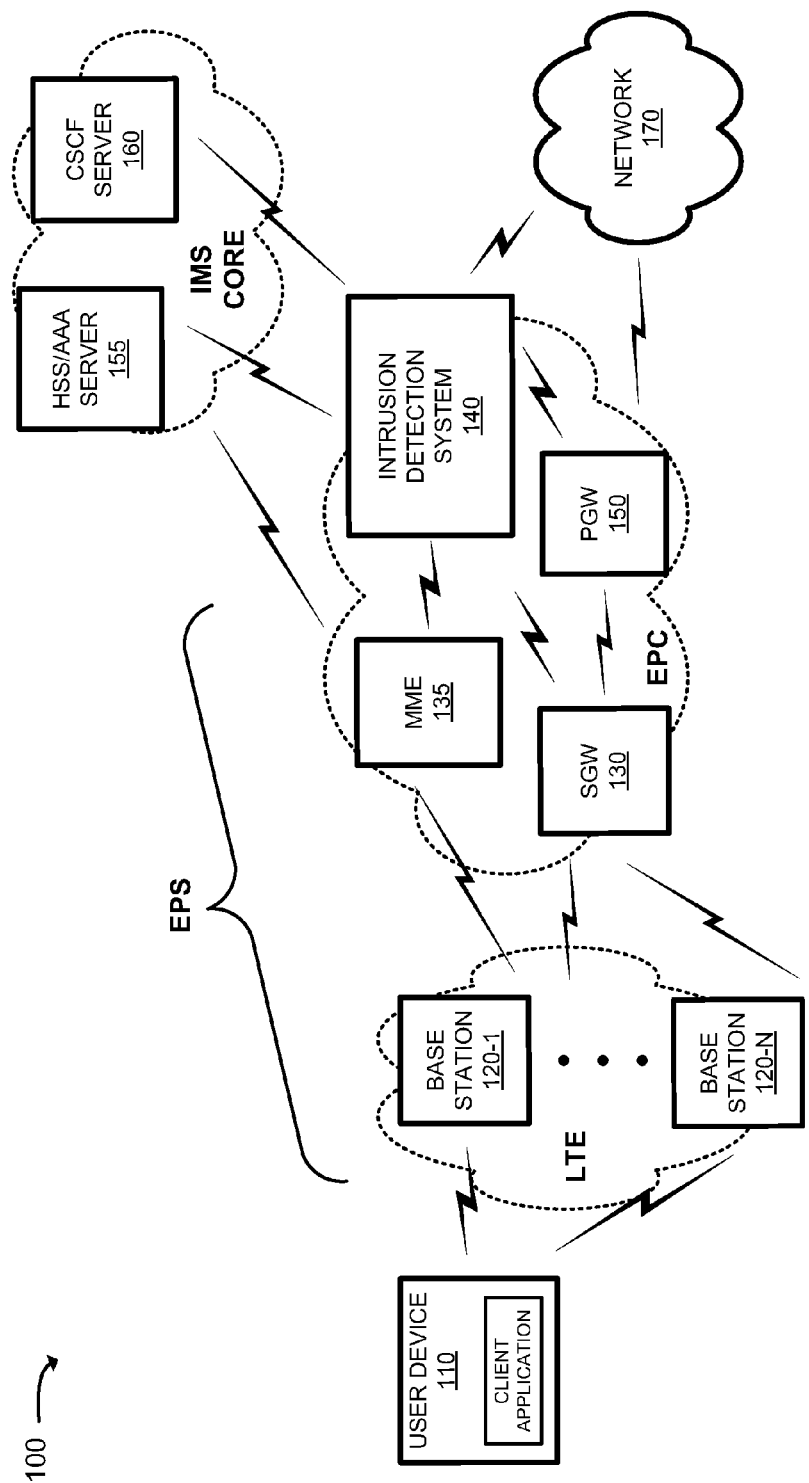
FIG. 1 is a diagram of an example environment in which systems and/or methods described herein may be implemented.

The following detailed description refers to the accompanying drawings. The same reference numbers in different drawings may identify the same or similar elements.

A carrier may refer to one or more of a mobile network operator (MNO), a mobile phone operator, a carrier service provider (CSP), a wireless service provider, a wireless carrier, a cellular company, and/or any other company that provides mobile phone service(s) to users (e.g., subscribers of the carrier) via a network. A carrier network may refer to a telecommunications network provided and operated by the carrier.

An impermissible behavior may refer to any behavior by a mobile communication device that interrupts normal operation of the mobile communication device and/or negatively affects a carrier network associated with the mobile communication device. An impermissible behavior, by a mobile communication device, may include, for example, one of: botnet activity associated with the mobile communication device; an attempt, by the mobile communication device, to access a known bad destination site; transmission of Internet Control Message Protocol (ICMP) errors messages associated with the mobile communication device; attacking, by the mobile communication device, a particular server as part of a denial-of-service (DoS) attack or a distributed denial-of-service (DDoS) attack; repeated attempts by the mobile communication device to access a service, provided by or via a network device, after the mobile communication device is already attached to a carrier network associated with the network device; unauthorized attach attempts by the mobile communication device; message storms by the mobile communication device; repeated invalid log-in or registration attempts by the mobile communication device; transmission, by the mobile phone device, of an amount of traffic that is greater than a particular threshold; transmission of mal-formed session initiation protocol (SIP) packets by the mobile communication device; invalid call attempt(s) by the mobile communication device; an impermissible setting/policy of the mobile communication device that refuses to allow a network device to access, for example, a particular application of the mobile communication device; etc.

Systems and/or methods, described herein, may enable a networking device, which is a component of a network security system, to detect and respond to an impermissible behavior by a mobile communication device. For example, the networking device may receive information associated with a mobile communication device. The networking device may determine, based on the received information, that the mobile communication device is engaging in impermissible behavior. In response, the networking device may execute a response to end the impermissible behavior by the mobile communication device by, for example, restricting access of the mobile communication device to a service provided by or via another network device. The networking device may also transmit, to the mobile communication device, a message that identifies the response and/or provides information about what needs to be done in order for normal access to be restored to the mobile communication device. After the networking device verifies a termination of the cause of the impermissible behavior, the networking device may restore normal access to the mobile communication device.

Due to the detection of the impermissible behavior by the networking device, the mobile communication device's battery power and/or radio link capacity may not be consumed due to the impermissible behavior. Furthermore, the performance of the mobile communication device may not be impacted due to execution and/or operation of a client application that detects the impermissible behavior since much of the analytical work, to detect the impermissible behavior, is being augmented by network security systems. The network security systems may include the network device that detects the impermissible behavior. Thus, the systems and/or methods may ensure universal security for mobile communication devices associated with the networking device, and may ensure that a streamlined client is installed on the mobile communication device. The streamlined client may be smaller and/or faster, use less battery power, use less processing power, and/or have less overall impact on the mobile communication device and/or on a user of the mobile communication device than another security client that independently detects impermissible behavior.

FIG. 1 is a diagram of an example environment 100 in which systems and/or methods described herein may be implemented. As shown in FIG. 1, environment 100 may include a user device 110, multiple base stations 120-1, . . . , 120-N (where N>1) (hereinafter referred to collectively as "base stations 120" and individually as "base station 120"), a serving gateway 130 (hereinafter referred to as "SGW 130"), a mobility management entity device 135 (hereinafter referred to as "MME 135"), an intrusion detection system 140, a packet data network (PDN) gateway (PGW) 150, a home subscriber server (HSS)/authentication, authorization, accounting (AAA) server 155 (hereinafter referred to as an "HSS/AAA server 155"), a call session control function (CSCF) server 160 (hereinafter referred to as "CSCF server 160"), and a network 170. The number of devices and/or networks, illustrated in FIG. 1, is provided for explanatory purposes only. In practice, there may be additional devices and/or networks; fewer devices and/or networks; different devices and/or networks; or differently arranged devices and/or networks than illustrated in FIG. 1.

Also, in some implementations, one or more of the devices of environment 100 may perform one or more functions described as being performed by another one or more of the devices of environment 100. Devices of environment 100 may interconnect via wired connections, wireless connections, or a combination of wired and wireless connections.

Implementations herein are described as being performed within a radio access network (RAN) that is based on a long term evolution (LTE) network for explanatory purposes. In other implementations, the implementations may be performed within a RAN that is not based on a LTE network.

Environment 100 may include a LTE network and/or an evolved packet core (EPC) that operate based on a third generation partnership project (3GPP) wireless communication standard. The LTE network may be a RAN that includes one or more base stations 120 that take the form of evolved Node Bs (eNBs) via which user devices 110 communicate with the EPC. The EPC may include SGW 130, MME 135, and/or PGW 150 and may enable user devices 110 to communicate with network 170 and/or an Internet protocol (IP) multimedia subsystem (IMS) core. The IMS core may include HSS/AAA server 155 and/or CSCF server 160 and may manage authentication, session initiation, account information, profile information, etc. associated with user devices 110.

User device 110 may include any computation or communication device, such as a wireless mobile communication device that is capable of communicating with base station 120 and/or a network (e.g., network 170). For example, user device 110 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a smart phone, a laptop computer, a tablet computer, a camera, a personal gaming system, or another type of mobile computation or communication device. User device 110 may send traffic to and/or receive traffic from network 170.

User device 110 may host a (lightweight) client application that is dedicated to receiving messages from intrusion detection system 140. In one example, user device 110 may use the client application to receive, from intrusion detection system 140, a message that specifies a response to an impermissible behavior of user device 110 and/or includes instructions for terminating a cause of the impermissible behavior. The instructions may include, for example, step(s)/command(s) for uninstalling an application of user device 110 and/or a directive for a user of user device 110 to contact an operator of intrusion detection system 140. The client application may use the instructions to uninstall the application. When the application is uninstalled, the client application may transmit a reply message, which indicates that that the application is uninstalled, to intrusion detection system 140. Intrusion detection system 140 may restore access of user device 110, to a particular service provided by or via a network device, in response to the reply message.

Base station 120 may include one or more devices that receive, process, and/or transmit traffic, such as audio, video, text, and/or other data, destined for and/or received from user device 110. In an example implementation, base station 120 may be an eNB associated with the LTE network that receives traffic from and/or sends traffic to network 170 via SGW 130 and PGW 150. Base station 120 may send traffic to and/or receive traffic from user device 110 via an air interface. Alternatively, or additionally, one or more other base stations 120 may be associated with a RAN that is not associated with the LTE network.

SGW 130 may include one or more computation or communication devices that gather, process, search, store, and/or provide information in a manner described herein. SGW 130 may include one or more data processing and/or traffic transfer devices, such as a gateway, a router, a modem, a switch, a firewall, a network interface card (NIC), a hub, a bridge, a proxy server, an optical add-drop multiplexer (OADM), or some other type of device that processes and/or transfers traffic. In one example implementation, SGW 130 may aggregate traffic received from one or more base stations 120 associated with the LTE network, and may send the aggregated traffic to network 170 (e.g., via PGW 150) and/or other network devices associated with the IMS core and/or the EPC. SGW 130 may also receive traffic from the other network devices and/or may send the received traffic to user device 110 via base station 120. SGW 130 may perform operations associated with handing off user device 110 from and/or to the LTE network.

MME 135 may include one or more computation or communication devices that gather, process, search, store, and/or provide information in a manner described herein. For example, MME 135 may perform operations associated with handing off user device 110, from a first base station 120 to a second base station 120, when user device 110 is exiting a cell associated with the first base station 120. MME 135 may perform an operation to handoff user device 110 from the second base station 120 to the first base station 120 when user device 110 is entering the cell associated with first base station 120.

Intrusion detection system 140 may include one or more computation or communication devices that gather, process, search, store, and/or provide information in a manner described herein. In one implementation, intrusion detection system 140 may include one or more servers and/or one or more computer systems (e.g., computer devices) that are separate from other network devices shown in FIG. 1. Alternatively, or additionally, intrusion detection system 140 may represent multiple, separate computer systems. Each one of the multiple, separate computer systems may be included in, or dedicated to working with, one or more particular network devices. Alternatively, or additionally, one or more network devices (e.g., MME 135) may perform one or more functions of intrusion detection system 140.

Intrusion detection system 140 may receive behavior information from one of the other network devices (e.g., MME 135, PGW 150, etc.) and/or from user device 110. Intrusion detection system 140 may detect impermissible behavior by user device 110 based on the behavior information. Intrusion detection system 140 may identify a rule associated with the impermissible behavior, and may execute a response to the impermissible behavior based on the rule. The response may restrict access of user device 110 to a service provided by or via one of the other network devices. Intrusion detection system 140 may also transmit a message to user device 110 that identifies the response and/or provides information about what needs to be done in order for normal access to the service to be restored. Intrusion detection system 140 may restore the access to the service after verifying a termination of a cause of the impermissible behavior.

PGW 150 may include one or more computation or communication devices that gather, process, search, store, and/or provide information in a manner described herein. PGW 150 may include one or more data processing and/or traffic transfer devices, such as a gateway, a router, a modem, a switch, a firewall, a NIC, a hub, a bridge, a proxy server, an OADM, or some other type of device that processes and/or transfers traffic. In one example implementation, PGW 150 may include a device that aggregates traffic received from one or more SGWs 130, etc. and may send the aggregated traffic to network 170. Alternatively, or additionally, PGW 150 may receive traffic from network 170 and may send the traffic toward user device 110 via SGW 130.

HSS/AAA server 155 may include one or more server devices, or other types of computation or communication devices, that gather, process, search, store, and/or provide information in a manner described herein. For example, HSS/AAA server 155 may manage, update, and/or store, in a memory associated with HSS/AAA server 155, profile information associated with user device 110 that identifies applications and/or services that are permitted for and/or accessible by user device 110, information associated with a user of user device 110 (e.g., a username, a password, a personal identification number (PIN), etc.), rate information, minutes allowed, and/or other information. Additionally, or alternatively, HSS/AAA server 155 may include a device that performs authentication, authorization, and/or accounting (AAA) operations associated with a communication session with user device 110.

CSCF server 160 may include one or more server devices, or other types of computation or communication devices, that gather, process, search, store, and/or provide information in a manner described herein. CSCF server 160 may process and/or route calls to and from user device 110 via the EPC. For example, CSCF server 160 may process calls, received from network 170, that are destined for user device 110. In another example, CSCF server 160 may process calls, received from user device 110, that are destined for network 170.

Network 170 may include one or more wired and/or wireless networks. For example, network 170 may include a cellular network, a public land mobile network (PLMN), a second generation (2G) network, a third generation (3G) network, a fourth generation (4G) network, a fifth generation (5G) network, and/or another network. Additionally, or alternatively, network 170 may include a wide area network (WAN), a metropolitan area network (MAN), a telephone network (e.g., the Public Switched Telephone Network (PSTN)), an ad hoc network, an intranet, the Internet, a fiber optic-based network (e.g., FiOS), and/or a combination of these or other types of networks.

Figure 2:
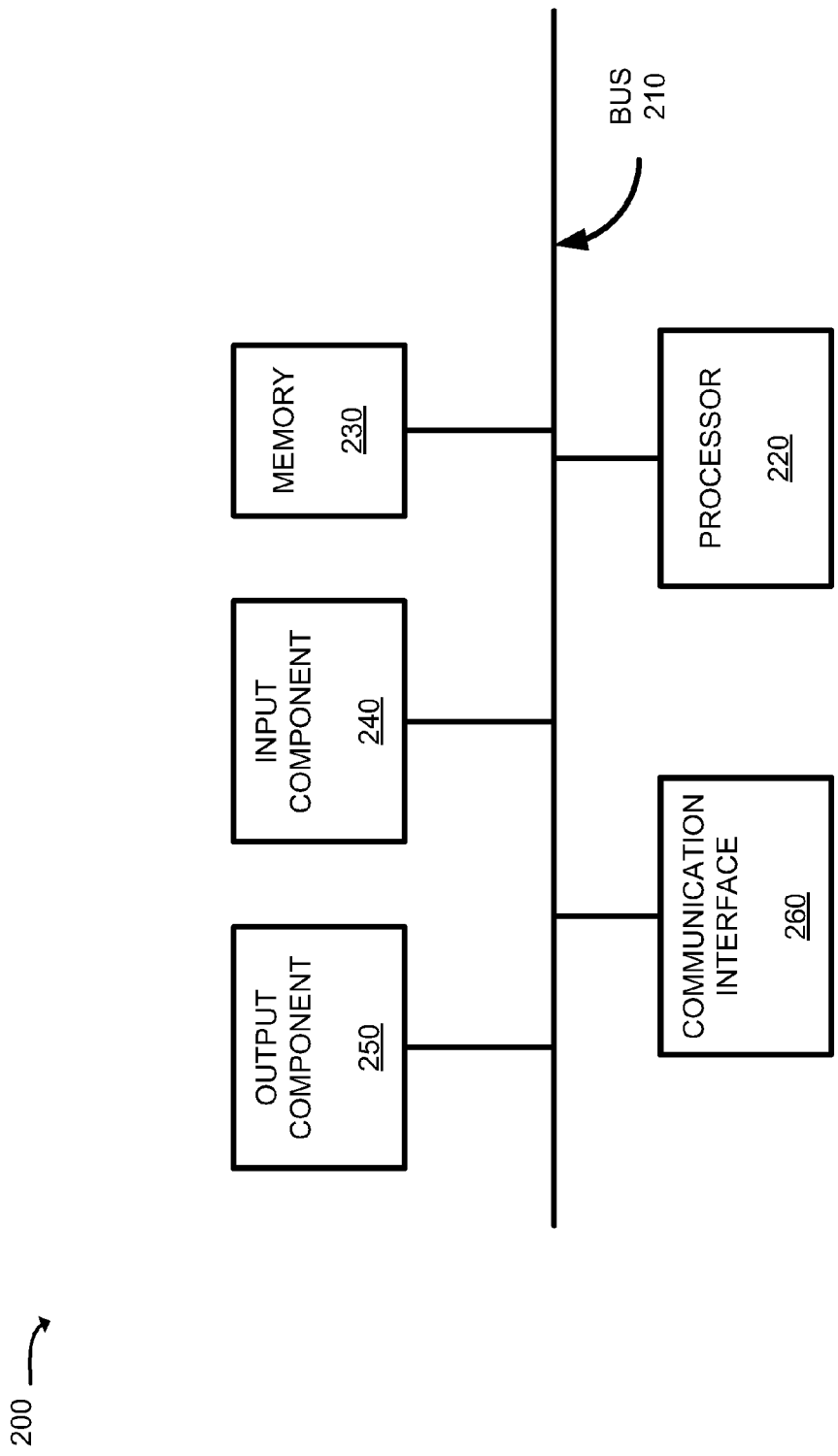
FIG. 2 is a diagram of example components of one or more of the devices of FIG. 1.

FIG. 2 is a diagram of example components of a device 200. Device 200 may correspond to user device 110, SGW 130, MME 135, intrusion detection system 140, PGW 150, HSS/AAA server 155, and/or CSCF server 160. Alternatively, or additionally, each of user device 110, SGW 130, MME 135, intrusion detection system 140, PGW 150, HSS/AAA server 155, and/or CSCF server 160 may include one or more devices 200 and/or one or more portions of device 200.

As shown in FIG. 2, device 200 may include a bus 210, a processor 220, a memory 230, an input component 240, an output component 250, and a communication interface 260. Although FIG. 2 shows example components of device 200, in other implementations, device 200 may contain fewer components, additional components, different components, or differently arranged components than depicted in FIG. 2. For example, device 200 may include one or more switch fabrics instead of, or in addition to, bus 210. Additionally, or alternatively, one or more components of device 200 may perform one or more tasks described as being performed by one or more other components of device 200.

Bus 210 may include a path that permits communication among the components of device 200. Processor 220 may include a processor, microprocessor, or processing logic that may interpret and execute instructions. Memory 230 may include any type of dynamic storage device that may store information and instructions, for execution by processor 220, and/or any type of non-volatile storage device that may store information for use by processor 220.

Input component 240 may include a mechanism that permits a user to input information to device 200, such as a keyboard, a keypad, a button, a switch, etc. Output component 250 may include a mechanism that outputs information to the user, such as a display, a speaker, one or more light emitting diodes (LEDs), etc. Communication interface 260 may include any transceiver-like mechanism that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. For example, communication interface 260 may include mechanisms for communicating with another device or system via a network, such as network 170. In one alternative implementation, communication interface 260 may be a logical component that includes input and output ports, input and output systems, and/or other input and output components that facilitate the transmission of data to other devices.

As described herein, device 200 may perform certain operations relating to content delivery based on service level thresholds. Device 200 may perform these operations in response to processor 220 executing software instructions contained in a computer-readable medium, such as memory 230. A computer-readable medium may be defined as a non-transitory memory device. A memory device may include space within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of or in combination with software instructions to implement processes described herein. Thus, implementations described herein are not limited to any specific combination of hardware circuitry and software.

Figure 3:
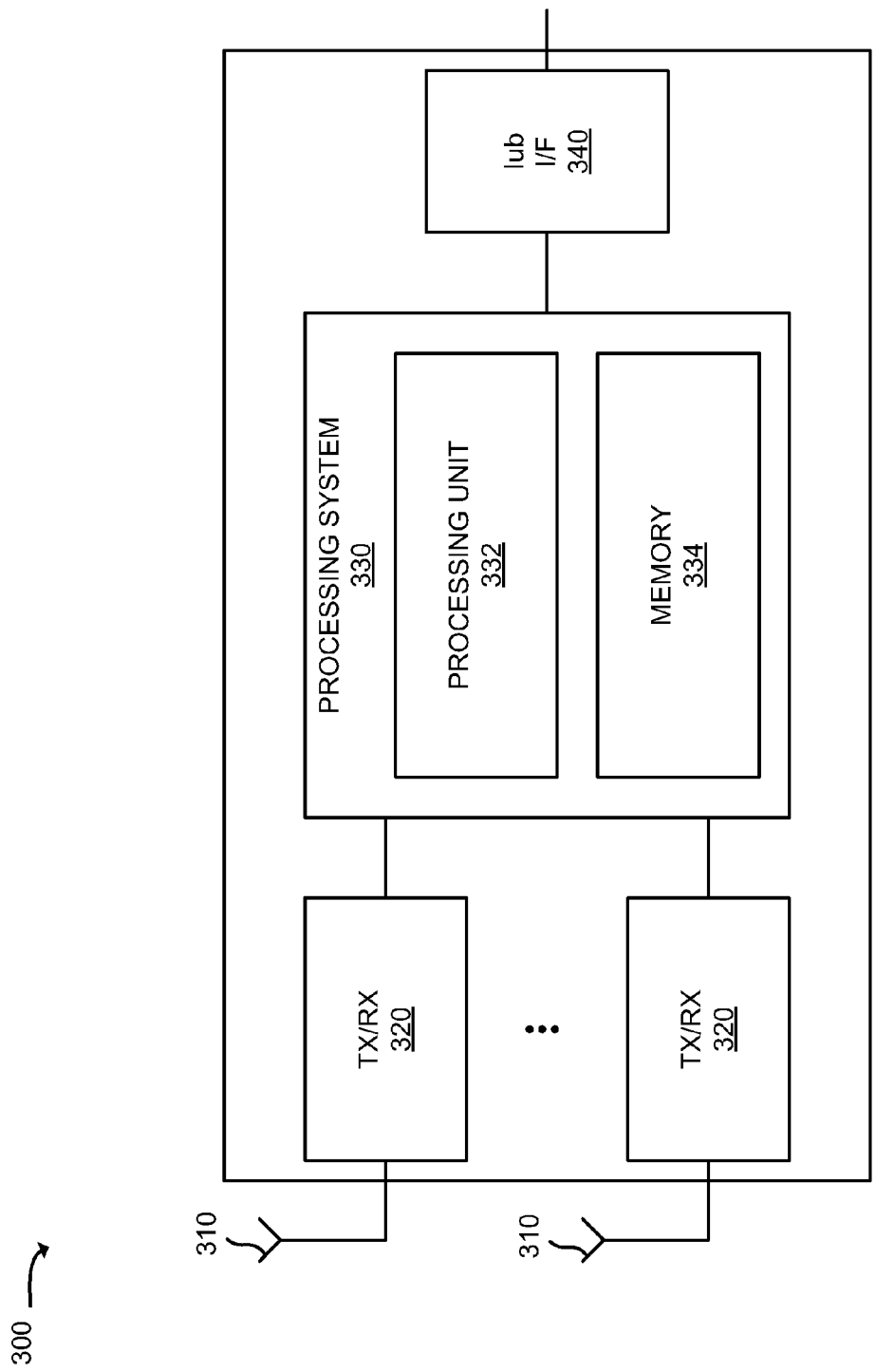
FIG. 3 is a diagram of example components of one or more base stations of FIG. 1.

FIG. 3 is a diagram of example components of a device 300 that may correspond to one or more of base stations 120. Alternatively, or additionally, one or more of base stations 120 may include one or more devices 300 and/or one or more portions of devices 300.

Although FIG. 3 shows example components of device 300, in other implementations, device 300 may contain fewer components, different components, differently arranged components, or additional components than depicted in FIG. 3. Alternatively, or additionally, one or more components of device 300 may perform one or more other tasks described as being performed by one or more other components of device 300.

As shown in FIG. 3, device 300 may include antennas 310, transceivers (TX/RX) 320, a processing system 330, and an Iub interface (I/F) 340. Antennas 310 may include one or more directional and/or omni-directional antennas. Transceivers 320 may be associated with antennas 310 and may include transceiver circuitry for transmitting and/or receiving symbol sequences in a network, such as network 170, via antennas 310.

Processing system 330 may control the operation of device 300. Processing system 330 may also process information received via transceivers 320 and Iub interface 340. Processing system 330 may further measure quality and strength of a connection, may determine a frame error rate (FER), and may transmit this information to network 170. As illustrated, processing system 330 may include a processing unit 332 and a memory 334.

Processing unit 332 may include one or more processors, microprocessors, application specific integrated circuits (ASICs), field programmable gate arrays (FPGAs), or the like. Processing unit 332 may process information received via transceivers 320 and Iub interface 340. The processing may include, for example, data conversion, forward error correction (FEC), rate adaptation, Wideband Code Division Multiple Access (WCDMA) spreading/dispreading, quadrature phase shift keying (QPSK) modulation, etc. In addition, processing unit 332 may transmit control messages and/or data messages, and may cause those control messages and/or data messages to be transmitted via transceivers 320 and/or Iub interface 340. Processing unit 332 may also process control messages and/or data messages received from transceivers 320 and/or Iub interface 340.

Memory 334 may include a random access memory (RAM), a read-only memory (ROM), and/or another type of memory to store data and instructions that may be used by processing unit 332.

Iub interface 340 may include one or more line cards that allow device 300 to transmit data to and receive data from radio network controller 140.

As described herein, device 300 may perform certain operations in response to processing unit 332 executing software instructions contained in a computer-readable medium, such as memory 334. The software instructions may be read into memory 334 from another computer-readable medium or from another device via antennas 310 and transceivers 320. The software instructions contained in memory 334 may cause processing unit 332 to perform processes described herein. Alternatively, hardwired circuitry may be used in place of or in combination with software instructions to implement processes described herein. Thus, implementations described herein are not limited to any specific combination of hardware circuitry and software.

Figure 4:
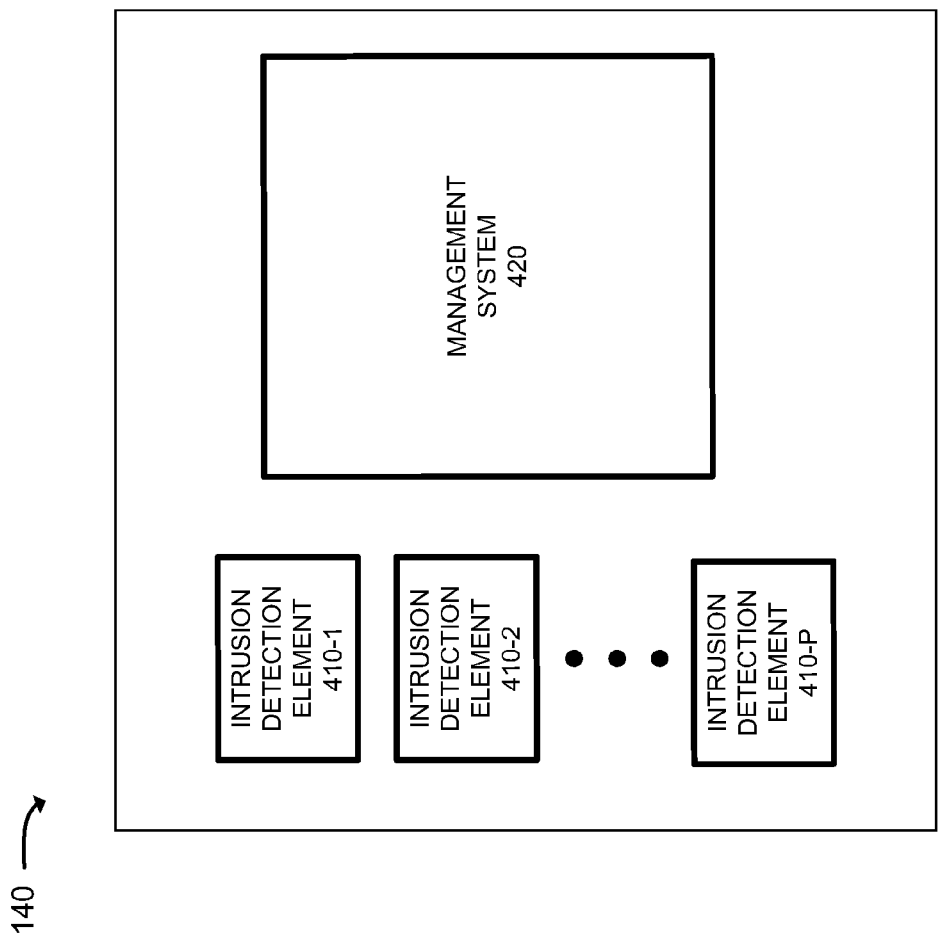
FIG. 4 is a diagram of example functional components of an intrusion detection system of FIG. 1.

FIG. 4 is a diagram of example functional components of intrusion detection system 140. As shown in FIG. 4, intrusion detection system 140 may include intrusion detection elements 410-1, 410-2, . . . , 120-P (where P≥1) (hereinafter referred to collectively as "intrusion detection elements 410" and individually as "intrusion detection element 410") and/or a management system 420.

Although FIG. 4 shows example functional components of intrusion detection system 140, in other implementations, intrusion detection system 140 may contain fewer functional components, different functional components, and/or additional functional components than depicted in FIG. 4. Alternatively, or additionally, one or more functional components of intrusion detection system 140 may perform one or more other tasks described as being performed by one or more other c functional components of intrusion detection system 140.

Each one of intrusion detection elements 410 may be associated with a corresponding, different network device. For example, intrusion detection element 410-1 may be associated with base stations 120, intrusion detection element 410-2 may be associated with SGW 130, intrusion detection element 410-3 may be associated with MME 135, intrusion detection element 410-4 may be associated with PGW 150, intrusion detection element 410-5 may be associated with PGW CSCF server 160, etc. In one implementation, one of intrusion detection elements 410 may be associated with user device 110. Each intrusion detection element 410 may receive, from the corresponding network device or from user device 110, behavior information that identifies or indicates only particular types of impermissible behavior and/or identifies a particular user device 110. Intrusion detection element 410 may detect an impermissible behavior of user device 110 based on the behavior information, and may identify a rule associated with the impermissible behavior.

Intrusion detection element 410 and/or management system 420 may execute a response to the impermissible behavior based on the rule. Management system 420 may transmit a message to user device 110 that identifies a rule and/or provides instructions/commands for terminating a cause of the impermissible behavior. Management system 420 may verify the termination of the cause of the impermissible behavior. Intrusion detection element 410 and/or management system 420 may restore an access of user device 110 to a service after management system 420 verifies the termination of the cause of the impermissible behavior.

Management system 420 may also create, or update, rules by correlating information associated with networking activity of user device 110 and/or other mobile phone devices. For example, management system 420 may receive information from base station 120 about one problem, and may receive information from CSCF server 160 about another problem. In isolation, the two problems may not be significant. However, based on both the problems, management system 420 may use a correlation engine to identify a coordinated attack. Management system 420 may determine an attack signature of the coordinated attack, and may create one or more rule(s) to end the coordinated attack. Management system 420 may associate the rules with one or more types of impermissible behavior. Thereafter, management system 420 may direct one or more intrusion detection elements 410 to detect the impermissible behavior and to identify the new rules to stop the coordinated attack. Intrusion detection element 410 and/or management system 420 may execute, based on the rules, responses to the detected impermissible behavior.

Figure 5:
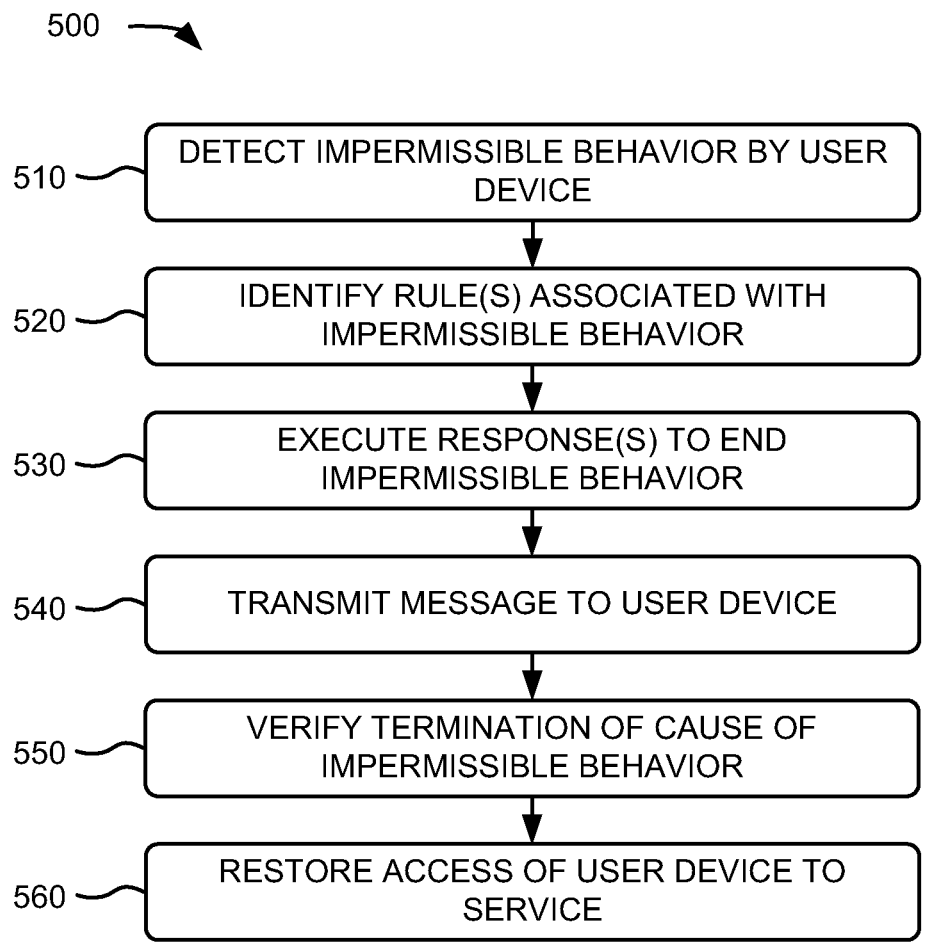
FIG. 5 is a flow chart of an example process for responding to impermissible behavior.

FIG. 5 is a flow chart of an example process 500 for responding to impermissible behavior. In one implementation, intrusion detection system 140 may perform process 500. In another implementation, some or all of process 500 may be performed by a device or collection of devices separate from, or in combination with intrusion detection system 140.

Process 500 may include detecting an impermissible behavior by a user device (block 510). In one implementation, intrusion detection system 140 may receive behavior information from user device 110. The behavior information may, for example, specify a particular setting or behavior of user device 110. For example, the behavior information may specify that user device 110 is enforcing a policy that prevents a network device from accessing an application/information of user device 110 that needs to be accessed by the network device. Intrusion detection system 140 may detect an impermissible behavior based on the behavior information from user device 110.

Alternatively, or additionally, intrusion detection system 140 may receive a report from a network device (e.g., MME 135). The report may include, for example, a particular type of impermissible behavior (e.g., repeated invalid log-in attempts) being performed by user device 110 and an identifier (e.g., an IP address, an International Mobile Equipment Identifier, etc.) associated with user device 110. Intrusion detection system 140 may detect, based on the report, that user device 110 is engaging in impermissible behavior of the particular type specified in the report. Alternatively, or additionally, intrusion detection system 140 may receive, from a network device, a report that includes behavior information associated with user device 110 and an identifier associated with user device 110. The behavior information may, for example, indicate that user device 110 has transmitted an amount of traffic that is greater than a particular threshold. Intrusion detection system 140 may detect an impermissible behavior by user device 110 based on the behavior information.

Process 500 may further include identifying one or more rules associated with the impermissible behavior (block 520) and executing one or more responses to end the impermissible behavior (block 530). For example, intrusion detection system 140 may detect one or more rules that are associated with the impermissible behavior. Each rule may specify an impermissible behavior and one or more responses to be executed to end the impermissible behavior. Intrusion detection system 140 may execute the one or more responses based on the identified rules. The responses may include, for example, enforcement instructions that may instruct the network device(s) to restrict the access of the user device to a service provided by or via the network device(s).

Additionally, or alternatively, the responses may include a message that includes one or more steps (e.g., measures and/or commands) required to be performed by user device 110, or a user of user device 110, to terminate a cause of the impermissible behavior. The one or more steps may include one or more of: user device 110 or the user uninstalling and/or installing a particular application, user device 110 or the user terminating a particular process of user device 110, user device 110 or the user rebooting user device 110, user device 110 or the user adjusting one or more configurations or settings of user device 110, the user contacting an operator of a carrier network associated with user device 110, etc. Alternatively, or additionally, the message may include a command for user device 110 to end the impermissible behavior by blocking access of user device 110 to a service, provided by or via the network device, for a particular period of time.

Additionally, or alternatively, the responses may include a new preferred roaming list (PRL) for user device 110. The PRL may specify which frequency bands and/or services user device 110 is able to utilize (e.g., whether user device 110 is able to roam). Accordingly, the new PRL may restrict access of user device 110 to services provided by or via the network device (e.g., base station 120).

Additionally, or alternatively, the responses may include an access control list (ACL) for user device 110. Assume that the detected impermissible behavior by user device 110 includes user device 110 attacking a particular server as part of a DoS attack or a DDoS attack. The ACL may include one or more IP addresses associated with one or more servers that user device 110 is not allowed to communicate with, including an IP address of the particular server.

Process 500 may also include transmitting a message to the user device (block 540). For example, one or more responses, as discussed above, may be transmitted to user device 110. The messages or responses may include, for example, information about the identified impermissible behavior, the one or more response(s), and/or a particular period of time for which the access of user device 110 to the service is restricted or blocked. Intrusion detection system 140 may transmit the message to user device 110.

Process 500 may also include verifying a termination of a cause of the impermissible behavior (block 550). In one implementation, intrusion detection system 140 may verify a termination of a cause of the impermissible behavior based on verification messages from one or more of user device 110, one or more network devices, an operator of a carrier network associated with user device 110, etc. The verification messages may, for example, indicate that the user of user device 110 and/or user device 110 have taken one or more measures necessary to terminate the cause of the impermissible behavior.

In one example, assume that the message includes a command for user device 110 to uninstall a particular application from user device 110. After the particular application is uninstalled, intrusion detection system 140 may receive, from user device 110, a verification message that indicates that the application is uninstalled. In another example, assume that the message includes an instruction for the user of user device 110 to contact the operator. After the user contacts the operator, intrusion detection system 140 may receive, from the operator, a verification message that the user complied with the instruction and/or that the cause of the impermissible behavior has been terminated. Additionally, or alternatively, when the message includes the particular period of time, verifying the termination of a cause of the impermissible behavior may include determining an end of the particular period of time.

Alternatively, or additionally, intrusion detection system 140 may verify a termination of a cause of the impermissible behavior when intrusion detection system 140 determines that a particular condition for ending the blocking/restriction of the access of user device 110 to the service is met. The particular condition may be met, for example, when intrusion detection system 140 receives confirmation that particular actions have been taken (e.g., that the user of user device 110 has contacted the operator) and/or when intrusion detection system 140 determines that the period of time, specified in the message, has passed.

Process 500 may also include restoring access of the user device to a service (block 560). For example, after verifying the termination of the cause of the impermissible behavior, intrusion detection system 140 may restore the access of user device 110 to the service. In one implementation, when restoring the access of the user device to the service, intrusion detection system 140 may transmit restoration instructions to the network device and/or to user device 110. The restoration instructions may instruct the network device and/or user device 110 to restore the access of user device 110 to the service. In one example, the restoration instructions may include an updated PRL list or an updated ACL list.

Figure 6:
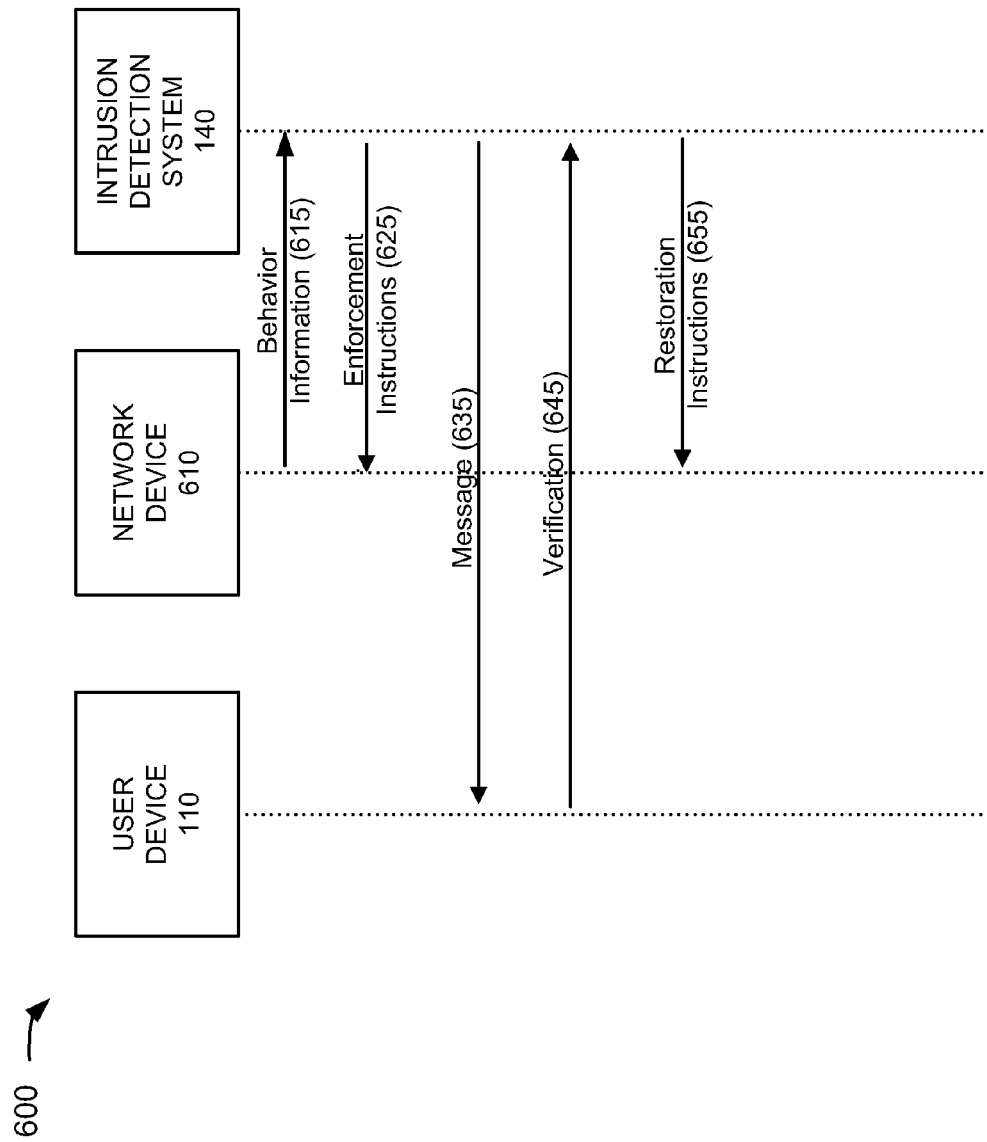
FIG. 6 is a flow diagram of example operations for responding to impermissible behavior.

FIG. 6 is a flow diagram 600 of example operations for responding to impermissible behavior. For example, a network device 610 may determine that user device 110 is engaging in impermissible behavior by making repeated log-in attempts to access a service provided by or via network device 610. Network device 610 may generate behavior information 615 that specifies a type of the impermissible behavior and identifies user device 110. Network device 610 may transmit behavior information 615 to intrusion detection system 140. Intrusion detection system 140 may detect the impermissible behavior by user device 110 based on behavior information 615, may identify a rule associated with behavior information 615, and may execute a response to the impermissible behavior based on the rule. To execute the response, intrusion detection system 140 may generate enforcement instructions 625, and may transmit enforcement instructions 625 to network device 610. Network device 610 may restrict access of user device 110 to the service based on enforcement instructions 625.

Based on the rule, intrusion detection system 140 may also generate a message 635 that may identify the response and/or provide information about what needs to be done in order for the access to the service to be restored for user device 110. For example, message 635 may specify that user device 110 needs to uninstall the application that is responsible for the repeated log-in attempts. User device 110 may uninstall the application based on message 635, and may transmit a verification 645 that specifies that the application is uninstalled from user device 110. Intrusion detection system 140 may verify a termination of a cause of the impermissible behavior based on verification 645. In response, intrusion detection system 140 may generate restoration instructions 655, and may transmit restoration instructions 655 to network device 610. Network device 610 may restore the access of user device 110 to the service based on restoration instructions 655.

The foregoing description of implementations provides illustration and description, but is not intended to be exhaustive or to limit the possible implementations to the precise form disclosed. Modifications and variations are possible in light of the above teachings or may be acquired from practice.

For example, while a series of blocks has been described with regards to FIG. 5, the order of the blocks may be modified in other implementations. Further, non-dependent blocks may be performed in parallel.

It will be apparent that example aspects, as described above, may be implemented in many different forms of software, firmware, and hardware in the implementations illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions of the system implementations may be implemented as a "component" that performs one or more functions. These components may include hardware, such as a processor, an ASIC, or a FPGA, or a combination of hardware and software.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the implementations includes each dependent claim in combination with every other claim in the claim set.

No element, act, or instruction used in the present application should be construed as critical or essential unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
  detecting, by a device, an impermissible behavior by a user device;
  identifying, by the device, a rule, of a plurality of rules, associated with the impermissible behavior,
    the plurality of rules including another rule that is associated with another impermissible behavior,
    the other impermissible behavior being an invalid call attempt by the user device, and
    the impermissible behavior being one of:
      repeated access attempts by the user device after the user device is attached to a network associated with a network device,
      repeated invalid log-in or registration attempts by the user device,
      transmission, by the user device, of an amount of traffic that is greater than a particular threshold, or
      transmission of malformed packets by the user device;
  executing, by the device, a response to the impermissible behavior based on the rule,
    the response restricting access of the user device to a service provided by or via the network device,
    the other rule specifying another response, and
    the other response being different from the response;
  transmitting, by the device and to the user device, a message that instructs the user device to terminate a cause of the impermissible behavior;
  verifying, by the device, a termination of the cause of the impermissible behavior; and
  restoring, by the device, the access of the user device to the service when the termination of the cause of the impermissible behavior is verified.

2. The method of claim 1, where detecting the impermissible behavior comprises:
  receiving a report from the network device, and
  detecting the impermissible behavior based on the report.

3. The method of claim 2, where the report comprises:
  a first identifier associated with the user device, and
  a second identifier associated with a type of the impermissible behavior or information about the impermissible behavior.

4. The method of claim 1,
  where the network device is a base station,
  where executing the response based on the rule comprises:
    transmitting enforcement instructions to the network device, and
  where the enforcement instructions instruct the network device to restrict the access of the user device to the service.

5. The method of claim 1,
  where restoring the access of the user device to the service comprises:
    transmitting restoration instructions to the network device, and
  where the restoration instructions instruct the network device to restore the access of the user device to the service.

6. The method of claim 1, where the message comprises:
  information identifying one or more steps required to be performed by the user device or a user of the user device for the termination of the cause of the impermissible behavior.

7. The method of claim 6, where verifying the termination of the cause of the impermissible behavior comprises:

determining that the one or more steps are complete based on verification from the user device or an operator of a carrier network associated with the user device.

8. The method of claim 6, where the one or more steps comprise one or more of:
uninstalling a first application,
installing a second application,
terminating a particular process,
rebooting the user device,
adjusting configurations of the user device, or
contacting an operator of a carrier network associated with the user device.

9. The method of claim 1,
where the access of the user device is restricted for a particular period of time,
where the message further specifies the particular period of time, and
where verifying the termination of the cause of the impermissible behavior comprises determining an end of the particular period of time.

10. A device comprising:
a memory to store instructions; and
a processor to execute one or more of the instructions to:
receive, from a network device, behavior information about a user device,
detect impermissible behavior by the user device based on the behavior information,
identify a rule, of a plurality of rules, associated with the impermissible behavior,
the plurality of rules including another rule that is associated with another impermissible behavior, and
the other impermissible behavior being transmission of malformed packets by the user device, and
the impermissible behavior being one of:
repeated access attempts by the user device after the user device is attached to a network associated with a network device,
repeated invalid log-in or registration attempts by the user device,
transmission, by the user device, of an amount of traffic that is greater than a particular threshold, or
an invalid call attempt by the user device,
execute, based on the rule, a response to the impermissible behavior,
the response restricting access of the user device to a service provided by or via the network device,
the other rule specifying another response, and
the other response being different from the response, and
transmit, to the user device, a message associated with the response.

11. The device of claim 10, where the processor is further to:
receive verification information that verifies one or more measures taken by the user device to terminate a cause of the impermissible behavior,
determine, based on the verification information, a termination of the cause of the impermissible behavior, and
restore the access of the user device to the service when termination of the cause of the impermissible behavior is verified.

12. The device of claim 11, where the one or more measures comprise one or more of:
terminating a particular process,
rebooting the user device, or
adjusting configurations of the user device.

13. The device of claim 10, where the processor is further to:
verify a termination of the impermissible behavior, and
transmit restoration instructions to the network device after verifying the termination of the impermissible behavior,
the restoration instructions instructing the network device to restore the access of the user device to the service.

14. The device of claim 10,
where, when executing the response to the impermissible behavior, the processor is to:
generate, based on the rule, instructions for the network device,
transmit the instructions to the network device, and
generate the message based on the rule,
where the instructions instruct the network device to restrict the access of the user device to the service, and
where the message comprises information about one or more measures required by the user device or a user of the user device for the access of the user device to the service to be restored.

15. One or more non-transitory computer-readable media storing instructions, the instructions comprising:
one or more instructions, which when executed by one or more processors of a computing device, cause the one or more processors to:
detect an impermissible behavior by a user device;
identify a rule, of a plurality of rules, associated with the impermissible behavior,
the plurality of rules including another rule that is associated with another impermissible behavior, and
the other impermissible behavior being one of:
transmission of malformed packets by the user device, or
an invalid call attempt by the user device, and
the impermissible behavior being one of:
repeated access attempts by the user device after the user device is attached to a network associated with a network device,
repeated invalid log-in or registration attempts by the user device, or
transmission, by the user device, of an amount of traffic that is greater than a particular threshold;
generate, based on the rule, a message for the user device,
the message comprising information identifying a response to the impermissible behavior,
the response including blocking an access of the user device to a service provided by or via the network device, and
the other rule specifying another response that is different from the response;
transmit the message to the user device;
determine that a particular condition for ending the blocking of the access of the user device to the service is met; and
restore the access of the user device to the service after determining that the particular condition is met.

16. The media of claim 15,
where, when detecting the impermissible behavior by the user device, the instructions cause the one or more processors to:
receive information from the user device, and
detect the impermissible behavior based on the information, and where the information specifies an impermissible setting or behavior of the user device.

17. The media of claim 15, where the message further comprises a request for a user of the user device to contact an operator of the network device, and where the particular condition is met when the user contacts the operator.

18. The media of claim 15, where the message further comprises a period of time for which the access of the user device to the service is blocked, and where the particular condition is met when the period of time passes.

19. The media of claim 15, where the message further comprises a command that instructs the user device to uninstall a particular application of the user device, where the instructions further cause the one or more processors to:
   receive, from the user device, a confirmation that the particular application is uninstalled, and
   where the particular condition is met when the confirmation is received.

20. The media of claim 15, where the instructions further comprise:
   one or more instructions, which when executed by the one or more processors, cause the one or more processors to:
      transmit, based on the response, enforcement instructions to the network device,
         the enforcement instructions instructing the network device to block the access of the user device to the service provided by or via the network device.

* * * * *